United States Patent
Yoshida et al.

(10) Patent No.: US 11,975,281 B2
(45) Date of Patent: May 7, 2024

(54) SPUN-BONDED NONWOVEN FABRIC AND AIR FILTER CONSTITUTED FROM SPUN-BONDED NONWOVEN FABRIC

(71) Applicant: TORAY Industries, Inc., Tokyo (JP)

(72) Inventors: Jun Yoshida, Otsu (JP); Koji Yamano, Otsu (JP); Yohei Nakano, Otsu (JP); Makoto Nishimura, Osaka (JP)

(73) Assignee: TORAY INDUSTRIES, INC., Tokyo (JP)

( * ) Notice: Subject to any disclaimer, the term of this patent is extended or adjusted under 35 U.S.C. 154(b) by 703 days.

(21) Appl. No.: 17/261,352

(22) PCT Filed: Jul. 22, 2019

(86) PCT No.: PCT/JP2019/028646
§ 371 (c)(1),
(2) Date: Jan. 19, 2021

(87) PCT Pub. No.: WO2020/022260
PCT Pub. Date: Jan. 30, 2020

(65) Prior Publication Data
US 2021/0283541 A1 Sep. 16, 2021

(30) Foreign Application Priority Data
Jul. 27, 2018 (JP) .................................. 2018-141045

(51) Int. Cl.
*B01D 39/04* (2006.01)
*B01D 39/16* (2006.01)
(Continued)

(52) U.S. Cl.
CPC ........... *B01D 39/163* (2013.01); *B01D 39/04* (2013.01); *D01F 6/46* (2013.01); *D04H 3/16* (2013.01);
(Continued)

(58) Field of Classification Search
CPC ...................................................... B01D 39/04
See application file for complete search history.

(56) References Cited

U.S. PATENT DOCUMENTS

2012/0097037 A1  4/2012  Matsuda et al.
2013/0288555 A1  10/2013  Berkemann et al.
(Continued)

FOREIGN PATENT DOCUMENTS

CN  102470302 A  5/2012
CN  103328704 A  9/2013
(Continued)

OTHER PUBLICATIONS

Chinese Office Action and Search Report for Chinese Application 201980048655.7, dated Oct. 14, 2022, with English Translation.
(Continued)

*Primary Examiner* — Robert A Hopkins
(74) *Attorney, Agent, or Firm* — Birch, Stewart, Kolasch & Birch, LLP

(57) ABSTRACT

The present invention is intended to provide a spunbond nonwoven fabric having low pressure loss, high collecting performance, and excellent processability and an air filter fabricated using the spunbond nonwoven fabric, the spunbond nonwoven fabric including fibers formed of a polyolefin-based resin, in which an average single fiber diameter of the fibers is 6.5 µm or more and 22.0 µm or less, a hindered amine-based compound represented by Formula (1) is contained at 0.1% by mass or more and 5% by mass or less, a melt flow rate (MFR) of the nonwoven fabric is 32 g/10 minutes or more and 850 g/10 minutes or less, and the nonwoven fabric is processed into an electret.

8 Claims, 1 Drawing Sheet

(51) Int. Cl.
  *D01F 6/46* (2006.01)
  *D04H 3/16* (2006.01)
  *D04H 1/4382* (2012.01)
  *D04H 3/007* (2012.01)

(52) U.S. Cl.
  CPC ............ *B01D 2239/0627* (2013.01); *B01D 2239/1233* (2013.01); *D04H 1/43838* (2020.05); *D04H 3/007* (2013.01)

(56) References Cited

U.S. PATENT DOCUMENTS

| | | |
|---|---|---|
| 2014/0017966 A1 | 1/2014 | Nakano et al. |
| 2014/0187115 A1 | 7/2014 | Nakano et al. |
| 2014/0305090 A1 | 10/2014 | Kuroda et al. |
| 2014/0305306 A1 | 10/2014 | Iyama et al. |
| 2015/0239204 A1 | 8/2015 | Takebe et al. |
| 2015/0240390 A1 | 8/2015 | Yakake et al. |

FOREIGN PATENT DOCUMENTS

| | | | |
|---|---|---|---|
| CN | 103562446 A | | 2/2014 |
| CN | 103848435 A | | 7/2014 |
| CN | 103987888 A | | 8/2014 |
| CN | 104619901 A | | 5/2015 |
| CN | 104641027 A | | 5/2015 |
| JP | 61-289177 A | | 12/1986 |
| JP | 6-284361 A | | 9/1994 |
| JP | 2004299356 A | * | 10/2004 |
| JP | 2008-150753 A | | 7/2008 |
| JP | 2009-275327 A | | 11/2009 |
| JP | 2010-115585 A | | 5/2010 |
| JP | 2011-6810 A | | 1/2011 |
| JP | 2011006810 A | * | 1/2011 |
| JP | 2011-72911 A | | 4/2011 |
| JP | 2013-540904 A | | 11/2013 |
| JP | 2017-94250 A | | 6/2017 |
| TW | 200839050 | | 10/2008 |
| WO | WO2014/042253 A1 | | 3/2014 |

OTHER PUBLICATIONS

Indian Office Action for Indian Application No. 202147007072, dated Jul. 19, 2022, with English translation.
Chinese Office Action and Search Report for Chinese Application No. 201980048655.7, dated Dec. 19, 2022, with English translation.
Indonesian Office Action for Indonesian Application No. P00202101376, dated Dec. 13, 2022, with English translation.
Chinese Office Action and Search Report for Chinese Application No. 201980048655.7, dated May 6, 2022, with English translation.
Japanese Office Action for corresponding Japanese Application No. 2020-532381, dated Jun. 6, 2023, with English translation.
Japanese Submission of Publications for Japanese Application No. 2020-532381, dated Feb. 27, 2023, with English translation.
Chinese Office Action for Chinese Application No. 201980048655.7, dated Mar. 30, 2023, with English translation.
International Search Report, issued in PCT/JP2019/028646, dated Sep. 10, 2019.
Written Opinion of the International Searching Authority, issued in PCT/JP2019/028646, dated Sep. 10, 2019.
Indian Office Action for Indian Application No. 202147007072, dated Dec. 7, 2023, with English translation.

* cited by examiner

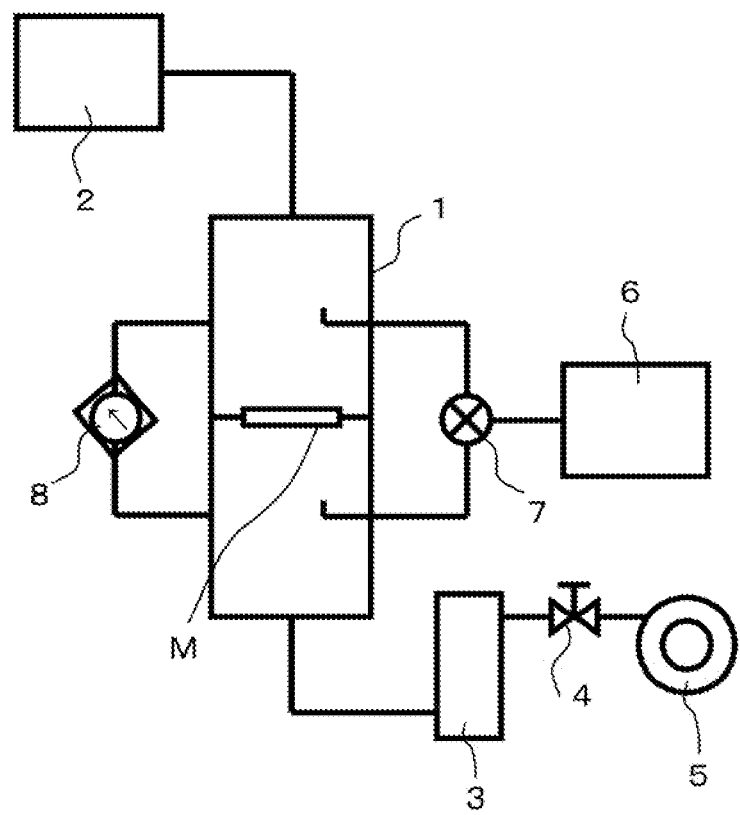

SPUN-BONDED NONWOVEN FABRIC AND AIR FILTER CONSTITUTED FROM SPUN-BONDED NONWOVEN FABRIC

TECHNICAL FIELD

The present invention relates to a spunbond nonwoven fabric. The present invention relates to a spunbond nonwoven fabric having low pressure loss and high collecting performance particularly when being used as an air filter and excellent processability, and an air filter formed of the spunbond nonwoven fabric.

BACKGROUND ART

Hitherto, an air filter has been used to remove pollen, dust and the like in gas, and a fiber sheet is often used as a filter medium. The performance required for an air filter is to be able to collect a large amount of micro dust (high collecting performance) and to have little resistance when gas passes through an inside of the air filter (low pressure loss characteristics).

The collecting mechanism by an air filter is mainly physical actions such as Brownian diffusion, blocking, and inertial impaction, and it is thus suitable that the constituent fiber sheet has a relatively low fineness in order to obtain a filter medium having higher collecting performance. On the other hand, in the case of trying to obtain equal collecting performance, the fiber density in the sheet is required to be increased, that is, the pore size is required to be decreased, and as a result, pressure loss increases.

Conversely, in order to obtain a filter medium having low pressure loss, it is only required that the constituent fiber sheet has a relatively high fineness, but the gaps between the fibers in the sheet are widened, and the collecting performance thus decreases.

As described above, to have high collecting performance and to have low pressure loss characteristics are in a contradictory relationship, and it is significantly difficult to achieve both of these. Hence, in general, nonwoven fabric sheets are properly used for different applications depending on the fineness of the constituent fibers such that a nonwoven fabric sheet formed of fibers having a low fineness is used for applications in which high collecting performance is considered to be important and a nonwoven fabric sheet formed of fibers having a high fineness is used for applications in which low pressure loss characteristics are considered to be important.

Meanwhile, there is known a technique for improving the collecting performance by charging the fiber sheet and utilizing an electrostatic action in addition to physical actions. For example, a method for manufacturing an electret fibrous sheet has been proposed in which a fibrous sheet is continuously converted into an electret by performing high pressure application using a non-contact type application electrode while moving a ground electrode and the fiber sheet together in a state in which the fibrous sheet is in contact with the ground electrode (Patent Document 1). In this method, polarization is derived by causing electron injection, ion movement, dipole orientation and the like in the nonwoven fabric and electric charges are imparted to the fibers.

This fiber sheet described in Examples of Patent Document 1 is a melt blown nonwoven fabric converted into an electret by high pressure application. In general, a sheet having a low fineness such as a melt blown nonwoven fabric has a larger total surface area of fibers per unit volume than a sheet having a high fineness, thus has a greater charging effect and further improved collecting performance, and can be used in applications in which high collection is considered to be more important.

On the other hand, it has been attempted to apply this charging technique to a sheet having a high fineness and thus to impart high collecting performance to the original low pressure loss characteristics.

There is a spunbond method as a method for relatively easily obtaining a sheet having a high fineness, studies to charge a nonwoven fabric obtained by the spunbond method have been conducted, for example, as disclosed in Patent Documents 2 and 3.

PRIOR ART DOCUMENTS

Patent Documents

Patent Document 1: Japanese Patent Laid-Open Publication No. 61-289177
Patent Document 2: Japanese Patent Laid-Open Publication No. 2008-150753
Patent Document 3: Japanese Patent Laid-Open Publication No. 2009-275327

SUMMARY OF THE INVENTION

Problems to be Solved by the Invention

However, the melt blown nonwoven fabric as in Patent Document 1 has a high collecting efficiency but is inferior in strength and has a problem that tearing occurs at the processing stage and the product stage. In the spunbond nonwoven fabrics disclosed in Patent Documents 2 and 3, the single fiber fineness (average single fiber diameter) of the fibers used in Examples is in a general range, thus there is no problem with the strength when the spunbond nonwoven fabrics are formed into air filters, but the collecting performance of the air filters is not sufficient.

Accordingly, an object of the present invention is to provide a spunbond nonwoven fabric having low pressure loss, high collecting performance, and excellent processability and an air filter fabricated using the spunbond nonwoven fabric.

Solutions to the Problems

The present inventors have attempted to further improve the collecting performance of the spunbond nonwoven fabrics according to the prior art by increasing the amount of fibers, but as a result, the pressure loss has increased because of the increased basis weight. As a result of further studies by the present inventors in order to achieve the object, it has been found out that it is possible to obtain a spunbond nonwoven fabric having low pressure loss and a high collecting efficiency by setting the melt flow rate of the spunbond nonwoven fabric to be in a specific range and the average single fiber diameter of the fibers constituting the spunbond nonwoven fabric to be in a specific range.

In other words, the present invention has been completed based on these findings, and the following inventions are provided according to the present invention.

The spunbond nonwoven fabric of the present invention is a spunbond nonwoven fabric which includes fibers formed of a polyolefin-based resin and in which an average single fiber diameter of the fibers is 6.5 μm or more and 22.0 μm or less, a hindered amine-based compound is contained at 0.1% by mass or more and 5% by mass or less, a melt flow rate (MFR) of the nonwoven fabric is 32 g/10 minutes or more and 850 g/10 minutes or less, and the nonwoven fabric is processed into an electret.

According to a preferred aspect of the spunbond nonwoven fabric of the present invention, the hindered amine-based compound is a compound represented by the following Formula (1).

[Chem. 1]

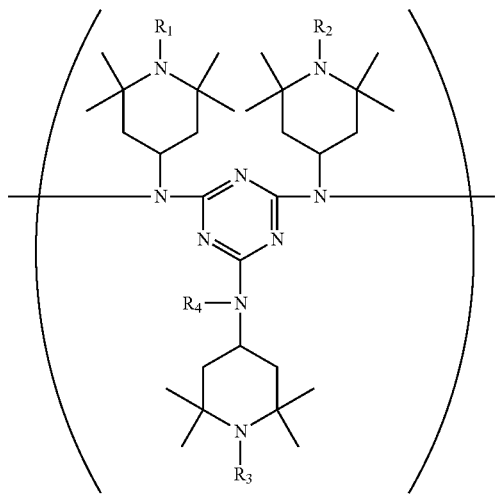

Formula (1)

(Wherein $R^1$ to $R^3$ are hydrogen or an alkyl group having 1 to 2 carbon atoms and $R^4$ is hydrogen or an alkyl group having 1 to 6 carbon atoms.)

According to a preferred aspect of the spunbond nonwoven fabric of the present invention, a basis weight of the spunbond nonwoven fabric is 5 g/m² or more and 60 g/m² or less.

According to a preferred aspect of the spunbond nonwoven fabric of the present invention, a thickness of the spunbond nonwoven fabric is 0.05 mm or more and 1.0 mm or less.

According to a preferred aspect of the spunbond nonwoven fabric of the present invention, a tensile strength per unit basis weight in a longitudinal direction is 0.3 (N/5 cm)/(g/m²) or more.

According to a preferred aspect of the spunbond nonwoven fabric of the present invention, a crystal nucleating agent is contained at 0.001% by mass or more and 1.0% by mass or less.

The filter medium for air filter of the present invention is formed using the above-described spunbond nonwoven fabric.

Effects of the Invention

According to the present invention, the present invention can obtain a spunbond nonwoven fabric having low pressure loss, high collecting performance, and excellent processability and an air filter fabricated using the spunbond nonwoven fabric.

BRIEF DESCRIPTION OF THE DRAWING

FIG. 1 is a schematic side view illustrating a collecting efficiency and pressure loss measuring apparatus.

EMBODIMENTS OF THE INVENTION

The spunbond nonwoven fabric of the present invention is a spunbond nonwoven fabric which includes fibers formed of a polyolefin-based resin and in which an average single fiber diameter of the fibers is 6.5 μm or more and 22.0 μm or less, a hindered amine-based compound, preferably a compound represented by the following Formula (1) is contained at 0.1% by mass or more and 5% by mass or less, a melt flow rate (MFR) of the spunbond nonwoven fabric is 32 g/10 minutes or more and 850 g/10 minutes or less, and the spunbond nonwoven fabric is processed into an electret.

[Chem. 2]

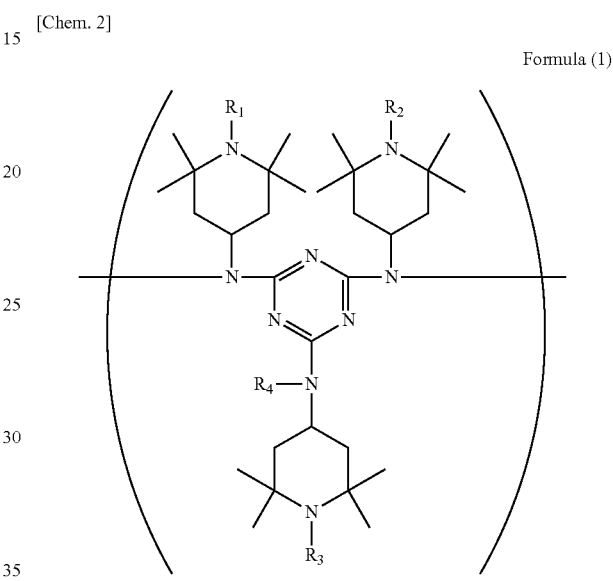

Formula (1)

(Wherein $R^1$ to $R^3$ are hydrogen or an alkyl group having 1 to 2 carbon atoms and $R^4$ is hydrogen or an alkyl group having 1 to 6 carbon atoms.)

Hereinafter, the constituents of the spunbond nonwoven fabric will be described in detail, but the present invention is not limited to the scope described below at all as long as the gist thereof is not exceeded.

[Resin]

The fibers constituting the spunbond nonwoven fabric used in the present invention are formed of a polyolefin-based resin. Examples of this polyolefin-based resin include polypropylene-based resins and polyethylene-based resins. Examples of the polypropylene-based resins include a homopolymer of propylene or copolymers of propylene and various α-olefins. Examples of the polyethylene resins include a homopolymer of ethylene or copolymers of ethylene and various α-olefins. Among these materials, those mainly composed of polypropylene are preferable from the viewpoint of particularly exhibiting electret performance. Other components may be copolymerized as long as the properties of the polymer are not impaired.

The polyolefin-based resin used in the present invention may be a mixture of two or more kinds, and a resin composition containing another polyolefin resin, thermoplastic elastomer and the like can also be used. Of course, the MFR can be adjusted by blending two or more kinds of thermoplastic resins having different MFRs at an arbitrary proportion.

As the MFR of the polyolefin-based resin used in the present invention, the value measured by ASTM D1238 (method A) is adopted.

According to this standard, for example, it is prescribed that polypropylene is measured at a load of 2.16 kg and a temperature of 230° C. and polyethylene is measured at a load of 2.16 kg and a temperature of 190° C. In a case in which plural kinds of resins are used, the measurement is performed at the highest temperature among the measurement temperatures of the respective polyolefin-based resins.

The MFR of the polyolefin-based resin is preferably 32 g/10 minutes or more and 850 g/10 minutes or less. The lower limit of MFR is preferably 32 g/10 minutes or more, more preferably 60 g/10 minutes or more, still more preferably 80 g/10 minutes or more, particularly preferably 120 g/10 minutes or more, most preferably 155 g/10 minutes or more. The upper limit is preferably 850 g/10 minutes or less, more preferably 600 g/10 minutes or less, still more preferably 400 g/10 minutes or less. By setting MFR to be equal to or more than the lower limit, the thinning behavior of the fibers is stabilized when the fibers constituting the spunbond nonwoven fabric are spun and stable spinning is possible even if the fibers are drawn at a high spinning speed in order to increase productivity. By stabilizing the thinning behavior, yarn sway is suppressed and unevenness is less likely to be generated when the fibers are collected in a sheet shape. By setting MFR to be equal to or less than the upper limit, it is possible to draw the fibers stably and at a high spinning speed, thus to promote the orientation and crystallization of fibers, and to obtain fibers having high mechanical strength.

The melting point of the polyolefin-based resin used in the present invention is preferably 80° C. or more and 200° C. or less, more preferably 100° C. or more and 180° C. or less. By setting the melting point to preferably 80° C. or more, more preferably 100° C. or more, it is likely to obtain heat resistance that can withstand practical use. By setting the melting point to preferably 200° C. or less, more preferably 180° C. or less, it is easy to cool the yarns discharged from the nozzle, the fusion of fibers is suppressed, and it is likely to perform stable spinning. The melting point referred to here is a value measured under the condition of a rate of temperature rise of 20° C./min using a differential scanning calorimeter Model DSC-2 manufactured by PerkinElmer Co., Ltd.

Additives such as antioxidants, weather stabilizers, light stabilizers, antistatic agents, fogging agents, blocking inhibitors, lubricants, nucleating agents, and pigments which are usually used or other polymers can be added to the polyolefin-based resin used in the present invention, if necessary, as long as the effects of the present invention are not impaired.

It is important for the spunbond nonwoven fabric of the present invention that the fiber material contains a hindered amine-based compound, preferably a compound represented by Formula (1) (hindered amine-based compound) from the viewpoint that additives such as heat stabilizers, weather resistant agents, and polymerization inhibitors can be added and the charging property and charge retention property are more favorable when the nonwoven fabric is treated into an electret.

It is important that the hindered amine-based compound agent is contained at 0.1% to 5% by mass, and the lower limit of the content of the hindered amine-based compound is preferably 0.2% by mass or more, more preferably 0.3% by mass or more, particularly preferably 0.5% by mass or more. The content is preferably 4% by mass or less, more preferably 3% by mass or less, particularly preferably 2.5% by mass or less.

Examples of the hindered amine-based compound include poly[(6-(1,1,3,3-tetramethylbutyl)amino-1,3,5-triazine-2,4-diyl) ((2,2,6,6-tetramethyl-4-piperidyl)imino)hexamethylene ((2,2,6,6-tetramethyl-4-piperidyl)imino)] ("Chimassorb" (registered trademark) 944LD manufactured by BASF Japan Ltd.), dimethyl-1-(2-hydroxyethyl) succinate-4-hydroxy-2,2,6,6-tetramethylpiperidin polycondensate ("Tinuvin" (registered trademark) 622LD manufactured by BASF Japan Ltd.), 2-(3,5-di-t-butyl-4-hydroxybenzyl)-2-n-butyl-malonic acid bis(1,2,2,6,6-pentamethyl-4-piperidyl) ("Tinuvin" (registered trademark) 144 manufactured by BASF Japan Ltd.), and a polycondensate of dibutylamine 1,3,5-triazine N,N'-bis(2,2,6,6-tetramethyl-4-piperidyl-1,6-hexamethylenediamine N-(2,2,6,6-tetramethyl-4-piperidine) butylamine ("Chimassorb" (registered trademark) 2020FDL manufactured by BASF Japan Ltd.). Among these, the compound (hindered amine-based additive) represented by Formula (1) is preferable from the viewpoint of charging property and charge retention property when the spunbond nonwoven fabric is treated into an electret. Specifically, poly[(6-(1,1,3,3-tetramethylbutyl)amino-1,3,5-triazine-2,4-diyl) ((2,2,6,6-tetramethyl-4-piperidyl)imino)hexamethylene ((2,2,6,6-tetramethyl-4-piperidyl)imino)] ("Chimassorb" (registered trademark) 944LD manufactured by BASF Japan Ltd.) and a polycondensate of dibutylamine 1,3,5-triazine N,N'-bis(2,2,6,6-tetramethyl-4-piperidyl-1,6-hexamethylenediamine N-(2,2,6,6-tetramethyl-4-piperidine) butylamine ("Chimassorb" (registered trademark) 2020FDL manufactured by BASF Japan Ltd.) are preferable.

The hindered amine-based compound such as a compound having a structure represented by the following Formula (1) may be used singly or as a mixture of plural kinds.

[Chem. 3]

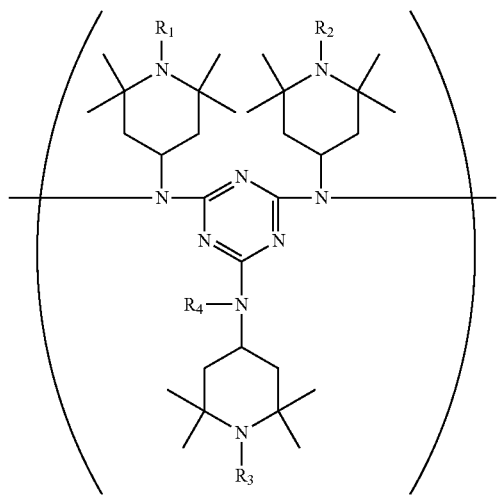

Formula (1)

(Wherein $R^1$ to $R^3$ are hydrogen or an alkyl group having 1 to 2 carbon atoms and $R^4$ is hydrogen or an alkyl group having 1 to 6 carbon atoms.)

It is possible to more effectively stabilize the electric charges imparted by charging by containing the compound in the spunbond nonwoven fabric, and it is thus possible to improve the collecting performance and to realize an air filter having low pressure loss and high collecting performance in a case in which the spunbond nonwoven fabric is used as a filter medium for the air filter.

The fibers constituting the spunbond nonwoven fabric of the present invention can contain a crystal nucleating agent in addition to the compound represented by Formula (1).

Examples of the crystal nucleating agent include sorbitol-based nucleating agents, nonitol-based nucleating agents, xylitol-based nucleating agents, phosphoric acid-based nucleating agents, triaminobenzene derivative nucleating agents, and carboxylic acid metal salt nucleating agents.

Sorbitol-based nucleating agents include dibenzylidene sorbitol (DBS), monomethyldibenzylidene sorbitol (for example, 1,3:2,4-bis(p-methylbenzylidene) sorbitol (p-MDBS)), dimethyldibenzylidene sorbitol (for example, 1,3:2,4-bis(3,4-dimethylbenzylidene) sorbitol (3,4-DMDBS)). Examples of the sorbitol-based nucleating agents include "Millad" (registered trademark) 3988 (manufactured by Milliken & Company) and "GEL ALL" (registered trademark) E-200 (manufactured by New Japan Chemical Co., Ltd.).

Nonitol-based nucleating agents include, for example, 1,2,3-trideoxy-4,6:5,7-bis-[(4-propylphenyl)methylene]-nonitol, and examples of the nonitol-based nucleating agents include "Millad" (registered trademark) NX8000 (manufactured by Milliken & Company).

Xylitol-based nucleating agents include, for example, bis-1,3:2,4-(5',6',7',8'-tetrahydro-2-naphthaldehydebenzylidene) 1-allylxylitol. Phosphoric acid-based nucleating agents include, for example, aluminum-bis(4,4',6,6'-tetra-tert-butyl-2,2'-methylenediphenyl-phosphate)-hydroxide, and examples of the phosphoric acid-based nucleating agents include "ADK STAB" (registered trademark) NA-11 (manufactured by ADEKA CORPORATION) and "ADK STAB" (registered trademark) NA-21 (manufactured by ADEKA CORPORATION).

Triaminobenzene derivative nucleating agents include, for example, 1,3,5-tris(2,2-dimethylpropanamide)benzene, and examples of the triaminobenzene derivative nucleating agents include "Irgaclear" (registered trademark) XT386 "(manufactured by BASF Japan Ltd.) represented by the following Formula (2). Carboxylic acid metal salt nucleating agents include, for example, sodium benzoate and calcium 1,2-cyclohexanedicarboxylate.

[Chem. 4]

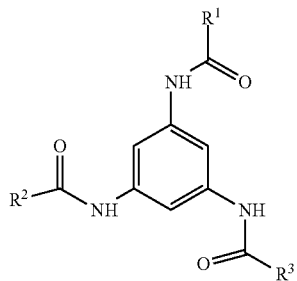

Formula (2)

(In Formula (2), $R^1$, $R^2$, and $R^3$ each independently denotes an alkyl group having 1 to 20 carbon atoms, an alkenyl group having 3 to 20 carbon atoms, a cycloalkyl group having 5 to 12 carbon atoms, a cycloalkenyl group having 5 to 9 carbon atoms, or an aryl group having 6 to 10 carbon atoms.)

The content of the crystal nucleating agent in the fibers constituting the nonwoven fabric is preferably 0.001% by mass or more and 1.0% by mass or less. When the content of the crystal nucleating agent is 0.001% by mass or more, more preferably 0.005% by mass or more, it is possible to effectively enhance the effect of the dust collecting performance. It is possible to suppress fusion between fibers and increase the ventilation volume. On the other hand, when the content of the crystal nucleating agent is 1.0% by mass or less, more preferably 0.5% by mass or less, the spinning property is stabilized and it is superior in terms of cost.

The spunbond nonwoven fabric of the present invention is formed of a polymer containing compounds as described above, but the polymer may contain stabilizers, which are usually contained in resin materials, such as antioxidants, light stabilizers, and heat stabilizers in addition to the above-described compounds.

The contents of the compound represented by Formula (1) and the crystal nucleating agent in the present invention are determined as follows.

The content referred to here can be determined, for example, as follows. After Soxhlet extraction of the nonwoven fabric with a mixed solution of methanol/chloroform, HPLC fractionation is repeated for the extract, and the structure of each fractionated substance is confirmed by IR measurement, GC measurement, GC/MS measurement, MALDI-MS measurement, $^1$H-NMR measurement, and $^{13}$C-NMR measurement. The sum of the masses of the fractionated substances containing the crystal nucleating agent is attained, the proportion thereof to the entire nonwoven fabric is determined, and this is taken as the content of the crystal nucleating agent. For the compound represented by Formula (1) as well, similarly the sum of the masses of the fractionated substances containing this compound is attained, the proportion thereof to the entire nonwoven fabric is determined, and this is taken as the content of the compound.

[Fiber]

As the fibers constituting the spunbond nonwoven fabric of the present invention, composite fibers can also be used. Examples of the composite form of the composite fibers include composite forms such as a concentric sheath-core type, an eccentric sheath-core type, and a sea island type. The fibers are not particularly limited and may be single component fibers, composite component fibers such as sheath-core type, sea island type, and the like, but single component fibers are a preferred aspect since there is a possibility that electric charges leak due to the difference in electrical resistance between the resins depending on the selection of resins in the case of composite component fibers.

It is important that the fibers constituting the spunbond nonwoven fabric used in the present invention have an average single fiber diameter of 6.5 or more and 22.0 μm or less. By setting the average single fiber diameter to preferably 6.5 μm or more, more preferably 7.5 μm or more, still more preferably 8.4 μm or more, it is possible to prevent a decrease in spinning property and to stably produce a high quality nonwoven fabric. On the other hand, by setting the average single fiber diameter to preferably 22.0 μm or less, more preferably 13.0 μm or less, still more preferably 11.2 μm or less, particularly preferably 10.0 μm or less, compactness and uniformity are high, processing characteristics that can withstand practical use are excellent, and high collecting efficiency can be obtained when an air filter is fabricated using the spunbond nonwoven fabric.

The cross-sectional shape of the fibers constituting the spunbond nonwoven fabric of the present invention is not particularly limited as long as the obtained spunbond nonwoven fabric is suitable for filter applications, but a circular shape, a hollow circular shape, an elliptical shape, a flat type, deformed types such as X-type and Y-type, a polygonal type, a multilobal type, and the like are preferred forms. The fiber diameter of a non-circular fiber is determined by taking a circumscribed circle and an inscribed circle with respect to the fiber cross section and calculating the average value of the diameters of these as the fiber diameter.

[Spunbond Nonwoven Fabric]

It is important that the MFR of the spunbond nonwoven fabric of the present invention is 32 g/10 minutes or more and 850 g/10 minutes or less. The MFR is 32 g/10 minutes or more, preferably 60 g/10 minutes or more, more preferably 80 g/10 minutes or more, still more preferably 120 g/10 minutes or more, most preferably 155 g/10 minutes or more. By setting the MFR to be in this range, the thinning progresses and it is possible to obtain a nonwoven fabric having a high collecting efficiency. On the other hand, by setting the MFR to 850 g/10 minutes or less, preferably 600 g/10 minutes or less, more preferably 400 g/10 minutes or less, the thinning behavior of the fibers at the time of spinning is stabilized and stable spinning is possible even if the fibers are drawn at a high spinning speed in order to increase productivity.

The value measured by ASTM D1238 (method A) is adopted as the MFR of the spunbond nonwoven fabric of the present invention. According to this standard, for example, it is prescribed that polypropylene is measured at a load of 2.16 kg and a temperature of 230° C. and polyethylene is measured at a load of 2.16 kg and a temperature of 190° C. In an aspect in which a spunbond nonwoven fabric as described later is laminated with another nonwoven fabric, the MFR is measured at the highest temperature among the measurement temperatures of the polyolefin-based resins constituting the spunbond nonwoven fabric in a case in which plural kinds of resins are used such that the polyolefin-based resin constituting the spunbond nonwoven fabric and the resin constituting the other nonwoven fabric are different from each other.

It is important that the spunbond nonwoven fabric of the present invention is charged, and it is possible to obtain high collecting performance while maintaining low pressure loss characteristics by the electrostatic adsorption effect as the spunbond nonwoven fabric is fabricated as a charged spunbond nonwoven fabric.

Here, the pressure loss and the collecting efficiency in the present invention are measured by the following measurement method or a measurement method by which a result equal to the result by this method is obtained. In other words, five 15 cm×15 cm measurement samples are taken from arbitrary parts of the spunbond nonwoven fabric and the collecting efficiency and pressure loss of each sample are measured using the collecting performance measuring apparatus outlined in FIG. 1.

The basis weight of the spunbond nonwoven fabric of the present invention is not particularly limited as long as it is suitable for filter applications but is preferably 5 g/m² or more, more preferably 8 g/m² or more, particularly preferably 10 g/m² or more. By setting the basis weight to be in this range, the strength and rigidity of the nonwoven fabric can be enhanced. The basis weight is preferably 60 g/m² or less, more preferably 50 g/m² or less, particularly preferably 40 g/m² or less. By setting the basis weight to be in this range, it is possible to decrease the pressure loss and to set the basis weight to be in a preferred range in terms of cost as well.

The spunbond nonwoven fabric of the present invention may be laminated with another sheet to form a laminate fiber sheet. For example, it is preferable to laminate the spunbond nonwoven fabric and a sheet having higher rigidity than the spunbond nonwoven fabric to improve the product strength and to use the spunbond nonwoven fabric in combination with a sheet having deodorizing and antibacterial functions.

It is preferable that the spunbond nonwoven fabric of the present invention has a tensile strength of 0.3 (N/5 cm)/(g/m²) or more per unit basis weight in the longitudinal direction. By setting the tensile strength per unit basis weight in the longitudinal direction to 0.3 (N/5 cm)/(g/m²) or more, preferably 0.5 (N/5 cm)/(g/m²) or more, more preferably 1.0 (N/5 cm)/(g/m²) or more, particularly preferably 1.5 (N/5 cm)/(g/m²), it is possible to form a spunbond nonwoven fabric which does not break during processing and is excellent in processability. The tensile strength per unit basis weight in the longitudinal direction can be adjusted by the spinning speed and average single fiber diameter of the fibers constituting the spunbond nonwoven fabric layer, the thermocompression bonding conditions (bonding ratio, temperature, and linear pressure) of the spunbond nonwoven fabric, and the like. The longitudinal direction referred to here is the longer direction of the nonwoven fabric.

As the percentage of tensile elongation at maximum strength of the tensile strength is preferably 15% or more, more preferably 20% or more, still more preferably 30% or more, the spunbond nonwoven fabric can be processed without breaking during molding and the like and can be formed into one excellent in processability.

The thickness of the spunbond nonwoven fabric of the present invention is preferably 0.05 to 1.0 mm. The thickness is preferably 0.05 to 1.0 mm, more preferably 0.08 to 0.8 mm, still more preferably 0.10 to 0.5 mm. The thickness is preferably in the above range in order to suppress an increase in pressure loss due to the pleated shape when the spunbond nonwoven fabric is formed into an air filter. It is not preferable that the thickness be less than the lower limit since it is difficult to obtain the shape retention property of the filter medium when air having a high volume is treated, and it is not preferable that the thickness exceed the upper limit since the storability decreases when the spunbond nonwoven fabric is used as an air filter.

The spunbond nonwoven fabric of the present invention preferably has a pressure loss per unit basis weight of 0.10 (Pa)/(g/m²) or more and 0.50 (Pa)/(g/m²) or less. The lower limit of the pressure loss per unit basis weight is preferably 0.10 (Pa)/(g/m²), more preferably 0.15 (Pa)/(g/m²) or more, still more preferably 0.20 (Pa)/(g/m²) or more, and the upper limit is preferably 0.50 (Pa)/(g/m²) or less, more preferably 0.45 (Pa)/(g/m²) or less, and further preferably 0.40 (Pa)/(g/m²) or less. By setting the pressure loss to be equal to or more than the lower limit, the number of fibers contained per unit basis weight increases or the total surface area increases, thus the spunbond nonwoven fabric does not break during processing, and strength excellent in processability can be obtained. By setting the pressure loss to be equal to or less than the upper limit, the number of fibers contained per unit basis weight or the total surface area is proper and a low pressure loss can be obtained.

[Method for Manufacturing Spunbond Nonwoven Fabric]

Next, an example of a method for manufacturing the spunbond nonwoven fabric of the present invention will be described.

The spunbond nonwoven fabric according to the present invention, a molten polyolefin-based resin is first spun from a spinneret as long fibers, these are suction-drawn with compressed air using an ejector, and then the fibers are collected on a moving net to form a nonwoven fabric.

As the shapes of the spinneret and the ejector, various shapes such as a round shape and a rectangular shape can be adopted. Among these, a combination of a rectangular nozzle and a rectangular ejector is preferably used since the amount of compressed air used is relatively small and thus it is excellent in terms of energy cost and fusion and scraping of yarns hardly occurs and thus opening of yarns is easy.

In the present invention, the polyolefin-based resin is melted in an extruder, weighed and supplied to a spinneret, and spun as long fibers. The spinning temperature when the polyolefin-based resin is melted and spun is preferably 200° C. or more and 270° C. By setting the spinning temperature to 200° C. or more, more preferably 210° C. or more, still more preferably 220° C. or more or to 270° C. or less, more preferably 260° C. or less, still more preferably 250° C. or less, it is possible to obtain a stable molten state and excellent spinning stability.

The spun long fiber yarns are then cooled. Examples of the method for cooling the spun yarns include a method in which cold air is forcibly blown to the yarns, a method in which the yarns are naturally cooled at the ambient temperature around the yarns, and a method in which the distance between the spinneret and the ejector is adjusted, or a method in which these methods are combined can be adopted. The cooling conditions can be appropriately adjusted and adopted in consideration of the discharge amount per single hole of the spinneret, the spinning temperature, the ambient temperature and the like.

Next, the cooled and solidified yarns are towed and drawn by the compressed air injected from the ejector. The spinning speed is preferably 3000 m/min or more and 6500 m/min or less. By setting the spinning speed to 3000 m/min or more and 6500 m/min or less, more preferably 3500 m/min or more and 6500 m/min or less, still more preferably 4000 m/min or more and 6500 m/min or less, the productivity increases, the orientation and crystallization of fibers proceed, and long fibers having high strength can be obtained. Normally, as the spinning speed is increased, the spinning property deteriorates and it is not possible to stably produce a yarn shape, but the intended polyolefin fibers can be stably spun by using a polyolefin-based resin having MFR in a specific range as described above.

Subsequently, the obtained long fibers are collected on a moving net to form a nonwoven fiber web. In the present invention, it is also a preferred aspect that the heat flat roll is brought into contact with the nonwoven fiber web from one side thereof on the net and temporarily bonded. By doing so, it is possible to prevent the surface layer of the nonwoven fabric layer from being turned over or blown off during conveyance on the net and the texture from deteriorating and to improve the conveying ability from yarn collecting to thermocompression bonding.

In the present invention, it is a preferred aspect for an air filter application that the intersections of the obtained nonwoven fiber webs are temporarily bonded using a heat flat roll before heat bonding.

It is a preferred aspect to set the surface temperature of the heat flat roll at the time of temporary heat bonding to be lower than the melting point of the polyolefin-based resin used by 60° C. to 25° C. The lower limit of the surface temperature of the heat flat roll is lower than the melting point of the polyolefin-based resin by preferably 60° C. or less, more preferably 55° C. or less. By setting the surface temperature to be equal to or more than the lower limit, it is possible to suppress excessive heat bonding at the time of the above-mentioned heat bonding and to obtain strength and breathability suitable for use in an air filter application. The upper limit of the surface temperature of the heat flat roll is lower than the melting point of the polyolefin-based resin by preferably 25° C. or more, more preferably 30° C. or more. By setting the surface temperature to be equal to or less than the upper limit, it is possible to suppress the formation of the nonwoven fabric surface into a film and to obtain proper breathability. In a case in which two or more kinds of polyolefin-based resins are blended and two or more melting points are observed, the surface temperature is adjusted to be in the above range with respect to the lowest temperature among the melting points of the respective polyolefin-based resins.

Examples of the method for heat-bonding the temporarily heat-bonded nonwoven fiber web described above include a method in which heat bonding is performed using various rolls such as heat embossing rolls with engraving (irregularity portion) on each of the surfaces of a pair of upper and lower rolls, a heat embossing roll including a combination of a roll with a flat (smooth) surface on one roll and a roll with engraving (irregularity portion) on the surface of the other roll, and a heat calender roll including a combination of a pair of upper and lower flat (smooth) rolls and an ultrasonic bonding method in which heat sealing is performed by ultrasonic vibration of the horn. It is a preferred aspect to use heat embossing rolls with engraving (irregularity portion) on each of the surfaces of a pair of upper and lower rolls or a heat embossing roll including a combination of a roll with a flat (smooth) surface on one roll and a roll with engraving (irregularity portion) on the surface of the other roll among these since the productivity is excellent, strength is imparted to the partially heat-bonded portion, and the texture and feel unique to nonwoven fabric can be maintained at the non-bonded portion.

As the surface material for the heat embossing roll, it is a preferred aspect to pair a metal roll and another metal roll in order to obtain a sufficient thermocompression bonding effect and to prevent the engraving (irregularity portion) of one embossing roll from being transferred to the surface of the other roll.

The embossing bonding area ratio by such a heat embossing roll is preferably 3% or more and 30% or less. By setting the bonding area ratio to 3% or more, more preferably 5% or more, still more preferably 8% or more, it is possible to obtain strength so that the nonwoven fabric can be put into practical use. On the other hand, by setting the bonding area ratio to preferably 30% or less, more preferably 25% or less, still more preferably 20% or less, it is possible to secure proper breathability suitable for use particularly in air filter applications. In the case of using ultrasonic bonding as well, the bonding area ratio is preferably in a similar range.

The bonding area ratio referred to here refers to the proportion of the bonding portion to the entire spunbond nonwoven fabric. Specifically, the bonding area ratio refers to the proportion of the part (bonding portion) at which the convex portion of the upper roll and the convex portion of the lower roll overlap each other and come into contact with the nonwoven fabric layer to the entire spunbond nonwoven fabric in the case of performing heat bonding using a pair of rolls with irregularities. The bonding area ratio refers to the proportion of the part (bonding portion) at which the convex portion of the roll with irregularities comes into contact with the nonwoven fabric layer to the entire spunbond nonwoven fabric in the case of performing heat bonding using a roll with irregularities and a flat roll. In the case of ultrasonic bonding, the bonding area ratio refers to the proportion of the part (bonding portion) to be heat-sealed by ultrasonic processing to the entire spunbond nonwoven fabric.

As the shape of the bonding portion by heat embossing rolls and ultrasonic bonding, a circular shape, an elliptical shape, a square shape, a rectangular shape, a parallelogram shape, a rhombus shape, a regular hexagon shape, a regular octagon shape and the like can be used. It is preferable that the bonding portions be uniformly present at regular intervals in each of the longitudinal direction (conveyance direction) and width direction of the spunbond nonwoven fabric. By doing so, it is possible to reduce variations in the strength of the spunbond nonwoven fabric.

It is a preferred aspect to set the surface temperature of the heat embossing roll at the time of heat bonding to be lower than the melting point of the polyolefin-based resin used by 50° C. to 15° C. By setting the surface temperature of the heat roll to be lower than the melting point of the polyolefin-based resin by preferably 50° C. or less, more preferably 45° C. or less, it is possible to obtain a spunbond nonwoven fabric having strength so as to be properly heat-bonded and put into practical use. By setting the surface temperature of the heat embossing roll to be lower than the melting point of the polyolefin-based resin by preferably 15° C. or more, more preferably 20° C. or more, excessive heat bonding is suppressed and the spunbond nonwoven fabric can obtain proper breathability and processability suitable for use particularly in air filter applications.

In a case in which two or more kinds of polyolefin-based resins are blended and two or more melting points are observed, the surface temperature is adjusted to be in the above range with respect to the lowest temperature among the melting points of the respective polyolefin-based resins.

The linear pressure of the heat embossing roll at the time of heat bonding is preferably 10 N/cm or more and 500 N/cm or less. By setting the linear pressure of the roll to preferably 10 N/cm or more, more preferably 50 N/cm or more, still more preferably 100 N/cm or more, particularly preferably 150 N/cm, it is possible to obtain a spunbond nonwoven fabric having strength so as to be properly heat-bonded and put into practical use. By setting the linear pressure of the heat embossing roll to preferably 500 N/cm or less, more preferably 400 N/cm or less, still more preferably 300 N/cm or less, the spunbond nonwoven fabric can obtain proper breathability and processability suitable for use particularly in air filter applications.

In the present invention, thermocompression bonding can be performed using a heat calender roll including a pair of upper and lower flat rolls before and/or after heat bonding using the heat embossing roll for the purpose of adjusting the thickness of the spunbond nonwoven fabric. A pair of upper and lower flat rolls are metal rolls or elastic rolls with no irregularity on the surface of the rolls, and a metal roll and another metal roll can be paired or a metal roll and an elastic roll can be paired and used.

The elastic roll referred to here is a roll formed of a material having elasticity as compared with a metal roll. Examples of the elastic roll include so-called paper rolls such as paper, cotton, and aramid paper and resin rolls formed of urethane-based resins, epoxy-based resins, silicon-based resins, polyester-based resins, hard rubber, and mixtures thereof.

It is a preferred aspect to use the above-mentioned heat bonding method in the method for heat-bonding an aspect in which the temporarily bonded nonwoven web and another sheet are laminated.

The charging method is not particularly limited when a spunbond nonwoven fabric which is processed into an electret is manufactured, but according to various findings by the present inventors, particularly a corona discharge method, a method in which charging is performed by adding water to the nonwoven fabric sheet and then drying the nonwoven fabric sheet (for example, the methods described in National Publication of International Patent Application No. 9-501604, Japanese Patent Laid-Open Publication No. 2002-249978 and the like), a thermoelectret method, and the like are suitably used. In the case of a corona discharge method, a field intensity of preferably 15 kV/cm or more, more preferably 20 kV/cm or more is suitable. The charging processing may be continuously performed during the manufacture of nonwoven fabric, or the manufactured nonwoven fabric may be wound once and processed in a separate step.

EXAMPLES

Hereinafter, the present invention will be described in more detail with reference to Examples, but the following Examples do not have intention to limit the present invention, and any design modification according to the gist described in the present specification is included in the technical scope of the present invention.

[Measurement Method]

With regard to the measurement methods, the measurement shall be performed by the methods described above if there is no particular description.

Next, the electret fiber sheet of the present invention will be described based on Examples. The characteristics and performance in the present invention are obtained by the following methods.

(1) Basis Weight of Spunbond Nonwoven Fabric:

The mass of a sheet of length×width=5 cm×5 cm was measured for 3 sheets per sample. The obtained value was converted into a value per 1 $m^2$ and rounded off to integers to calculate the basis weight of the sheet ($g/m^2$).

(2) Average Single Fiber Diameter:

With regard to the average single fiber diameter, ten measurement samples of 3 mm×3 mm were taken from arbitrary locations of the sheet, the magnification of the scanning electron microscope was adjusted to 200-fold to 3000-fold, and one fiber surface photograph was taken for each of the taken measurement samples for a total of 10 photographs. The single fiber diameters of the fibers of which the fiber diameters (single fiber diameters) were able to be clearly confirmed in the photograph were measured, and the average value thereof was rounded off to one decimal place to obtain the average single fiber diameter.

(3) Sheet Thickness:

The thickness of the sheet was measured at 10 points at equal intervals in the width direction using a thickness gauge ("TECLOCK" (registered trademark) SM-114 manufactured by TECLOCK Co., Ltd.), and the average value thereof was rounded off to two decimal places to obtain the thickness.

(4) Collecting Performance (Collecting Efficiency and Pressure Loss) of Spunbond Nonwoven Fabric:

Measurement samples of length×width=15 cm×15 cm were taken from five locations in the width direction of the sheet, and the collecting efficiency of each sample was measured using the collecting efficiency measuring apparatus illustrated in FIG. 1. In this collecting efficiency measuring apparatus illustrated in FIG. 1, a dust storage box 2 is connected to the upstream side of a sample holder 1 in which a measurement sample M is set and a flow meter 3, a flow adjusting valve 4, and a blower 5 are connected to the downstream side. Additionally, particle counter 6 is disposed at the sample holder 1; then the number of dusts of the measurement sample M on the upstream side and the number of dusts thereof on the downstream side can be each measured via a switching cock 7. The static pressure difference between on the upstream and downstream sides of the measurement sample M can be read by equipping the sample holder 1 with a pressure gauge 8.

To measure the collecting efficiency, a 10% solution of polystyrene 0.309U (manufacturer: NACALAI TESQUE, INC.) was diluted up to 200 times with distilled water and filled in the dust storage box 2. Next, the measurement sample M was set in the sample holder 1, and the air volume was adjusted by a flow adjusting valve 4 so that the filter passing speed was 6.5 m/min, the dust concentration was stabilized in a range ($2.83 \times 10^{-4}$ m$^3$ was equal to 0.01 ft$^3$) of $10,000/(2.83 \times 10^{-4}$ m$^3$) or more and $40,000/(2.83 \times 10^{-4}$ m$^3$) or less, the number of dusts D of the measurement sample M on the upstream side and the number of dusts d thereof on the downstream side were measured using the particle counter 6 (KC-01D manufactured by RION CO., LTD.) three times per one measurement sample, and the collecting efficiency (%) of particles of 0.3 μm or more and 0.5 μm or less was determined using the following equation based on JIS K 0901 (1991) "Method for testing shape, dimension, and performance of filter media for collection of dust sample in gas". The average value of the three measurement samples was taken as the final collecting efficiency.

Collecting efficiency (%)=[1−(d/D)]×100

(Wherein d denotes the total number of downstream dust measured three times and D denotes the total number of upstream dust measured three times.)

As the nonwoven fabric collects more dusts, the number of downstream dusts is smaller and thus the collecting efficiency value is higher. The pressure loss was determined by reading the static pressure difference between on the upstream and downstream sides of the measurement sample M at the time of collecting efficiency measurement using the pressure gauge 8. The average value for the five measurement samples was taken as the final pressure loss.

In a case in which the pressure loss was 25 Pa or less and the QF value that is an index of the collecting performance calculated according to the following equation was 0.13 Pa$^{-1}$ or more, it was judged to be acceptable.

QF value (Pa$^{-1}$)=−ln(1−collecting efficiency (%)/100)/pressure loss (Pa)

(5) Tensile Strength of Nonwoven Fabric Per Unit Basis Weight (N/5 cm)/(g/m$^2$):

As the tensile strength in the longitudinal direction, the values measured as follows in conformity with JIS L1913 (2010) 6.3.1 are adopted.
(A) Two test pieces with a width of 5 cm×30 cm are taken from a laminate nonwoven fabric.
(B) The test pieces are grasped and set in a tensile testing machine at an interval of 20 cm.
(C) A tensile test is performed at a tensile speed of 10 cm/min, the strength when the sample breaks is taken as the tensile strength (N/5 cm), and the average value at three points is calculated and rounded off to one decimal place. The tensile strength of the nonwoven fabric per unit basis weight is calculated by dividing the tensile strength obtained here by the basis weight measured in (1) above. In a case in which the tensile strength was 0.3 (N/5 cm)/(g/m$^2$) or more, it was judged to have tensile strength.

(6) Pressure Loss of Nonwoven Fabric Per Unit Basis Weight (Pa)/(g/m$^2$):

The pressure loss of the nonwoven fabric per unit basis weight is calculated by dividing the pressure loss measured in (4) above by the basis weight measured in (1) above, and the obtained value is rounded off to two decimal places. In a case in which the pressure loss of the nonwoven fabric per unit basis weight was 0.10 (Pa)/(g/m$^2$) or more and 0.50 (Pa)/(g/m$^2$) or less, it was judged to be acceptable.

(7) Density of Sheet:

The density of sheet is calculated by dividing the basis weight measured in (1) above by the thickness measured in (3) above. The obtained value was rounded off to three decimal places to calculate the density of sheet (g/cm. 3).

Example 1

A polyolefin-based resin in which a hindered amine-based compound "Chimassorb" (registered trademark) 944LD (manufactured by BASF Japan Ltd.) denoted as the compound A was contained in a polypropylene resin composed of a homopolymer having an MFR of 200 g/10 minute at 1% by mass was melted using an extruder and spun from a rectangular nozzle having a pore diameter of 0.30 mm and a pore depth of 2 mm at a spinning temperature of 235° C. and a single-hole discharge rate of 0.32 g/min to obtain yarns, and the yarns were cooled and solidified, then towed and drawn by compressed air having an ejector pressure of 0.35 MPa adjusted using a rectangular ejector, and collected on a collecting net. The obtained nonwoven fiber web was temporarily heat-bonded at a temperature of 120° C. using a flat roll, and the temporarily heat-bonded nonwoven web thus obtained was heat-bonded at a linear pressure of 30 N/cm and a heat bonding temperature of 130° C. using a pair of upper and lower heat embossing rolls composed of a metal embossing roll having polka dot engraving and a bonding area ratio of 16% as the upper roll and a metal flat rolls as the lower roll to obtain a spunbond nonwoven fabric having a basis weight of 30 g/m$^2$. The average single fiber diameter of the spunbond nonwoven fabric thus obtained was 10.1 μm. The spinning property was favorable as yarn breakage was not observed for one hour of spinning.

Water was allowed to permeate the entire surface of the fiber sheet by bringing a slit-shaped suction nozzle into contact with the surface and sucking water while running this spunbond nonwoven fabric along the water surface of the water tank to which pure water is supplied, then draining was performed, and then drying was performed with hot air at a temperature of 100° C. to obtain an electret nonwoven fabric. The respective measured and calculated values for the electret nonwoven fabric are presented in Table 1.

[Chem. 5]

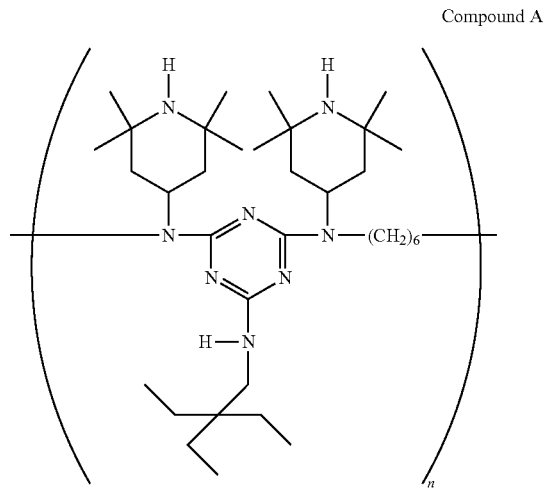

Compound A

Example 2

An electret nonwoven fabric was obtained in the same manner as in Example 1 except that the MFR was set to 800 g/10 minutes and the single-hole discharge rate was set to 0.21 g/min. The basis weight of the nonwoven fabric was 30 g/m², and the average single fiber diameter thereof was 7.2 µm. The spinning property was favorable as yarn breakage was not observed for one hour of spinning.

The respective measured and calculated values for the electret nonwoven fabric obtained are presented in Table 1.

Example 3

An electret nonwoven fabric was obtained in the same manner as in Example 1 except that the MFR was set to 155 g/10 minutes and the single-hole discharge rate was set to 0.24 g/min. The basis weight of the nonwoven fabric was 45 g/m², and the average single fiber diameter thereof was 8.9 µm. The spinning property was favorable as yarn breakage was not observed for one hour of spinning.

The respective measured and calculated values for the electret nonwoven fabric obtained are presented in Table 1.

Example 4

A polyolefin-based resin in which a hindered amine-based compound A "Chimassorb" (registered trademark) 944LD (manufactured by BASF Japan Ltd.) and a crystal nucleating agent "Irgaclear" (registered trademark) XT386 (manufactured by BASF Japan Ltd.) denoted as the compound B were contained in a polypropylene resin composed of a homopolymer having an MFR of 200 g/10 minute at 1% by mass and 0.05% by mass, respectively was melted using an extruder and spun from a rectangular nozzle having a pore diameter of 0.30 mm and a pore depth of 2 mm at a spinning temperature of 235° C. and a single-hole discharge rate of 0.32 g/min to obtain yarns, and the yarns were cooled and solidified, then towed and drawn by compressed air having an ejector pressure of 0.35 MPa adjusted using a rectangular ejector, and collected on a collecting net. An electret nonwoven fabric was obtained in the same manner as in Example 1 except for the above. The basis weight of the nonwoven fabric was 30 g/m², and the average single fiber diameter thereof was 9.8 µm. The spinning property was favorable as yarn breakage was not observed for one hour of spinning.

The respective measured and calculated values for the electret nonwoven fabric obtained are presented in Table 1.

[Chem. 6]

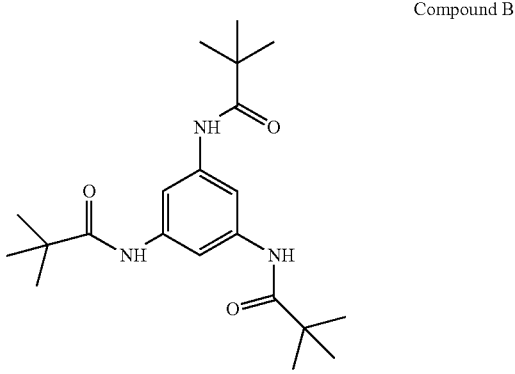

Compound B

Example 5

A polyolefin-based resin in which a hindered amine-based compound "Chimassorb" (registered trademark) 2020 FDL (manufactured by BASF Japan Ltd.) denoted as the compound C was contained in a polypropylene resin composed of a homopolymer having an MFR of 200 g/10 minute at 1% by mass was melted using an extruder and spun from a rectangular nozzle having a pore diameter of 0.30 mm and a pore depth of 2 mm at a spinning temperature of 235° C. and a single-hole discharge rate of 0.32 g/min to obtain yarns, and the yarns were cooled and solidified, then towed and drawn by compressed air having an ejector pressure of 0.35 MPa adjusted using a rectangular ejector, and collected on a collecting net. The obtained nonwoven fiber web was temporarily heat-bonded at a temperature of 145° C. using a flat roll, and the temporarily heat-bonded nonwoven web thus obtained was heat-bonded at a linear pressure of 30 N/cm and a heat bonding temperature of 145° C. using a pair of upper and lower heat embossing rolls composed of a metal embossing roll having polka dot engraving and a bonding area ratio of 16% as the upper roll and a metal flat rolls as the lower roll to obtain a spunbond nonwoven fabric having a basis weight of 60 g/m². The average single fiber diameter was 11.8 The spinning property was favorable as yarn breakage was not observed for one hour of spinning.

An electret nonwoven fabric was obtained in the same manner as in Example 1 except for the above. The respective measured and calculated values for the electret nonwoven fabric obtained are presented in Table 1.

[Chem. 7]

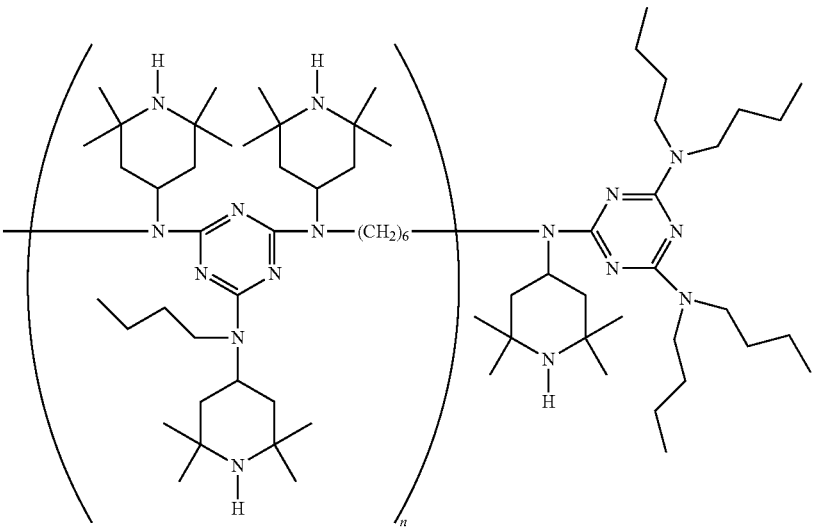

Compound C

Example 6

An electret nonwoven fabric was obtained in the same manner as in Example 5 except that the MFR was set to 155 g/10 minutes, the single-hole discharge rate was set to 0.37 g/min, and the ejector pressure was set to 0.20 MPa. The basis weight of the nonwoven fabric was 20 g/m², and the average single fiber diameter thereof was 11.8 μm. The spinning property was favorable as yarn breakage was not observed for one hour of spinning.

The respective measured and calculated values for the electret nonwoven fabric obtained are presented in Table 1.

Example 7

An electret nonwoven fabric was obtained in the same manner as in Example 2 except that the basis weight of the nonwoven fabric was 10 g/m², and the average single fiber diameter thereof was 6.6 μm. The spinning property was favorable as yarn breakage was not observed for one hour of spinning.

The respective measured and calculated values for the electret nonwoven fabric obtained are presented in Table 1.

Example 8

An electret nonwoven fabric was obtained in the same manner as in Example 1 except that the MFR was set to 39 g/10 minutes and the single-hole discharge rate was set to 0.65 g/min. The basis weight of the nonwoven fabric was 23 g/m², and the average single fiber diameter thereof was 21.5 μm. The spinning property was favorable as yarn breakage was not observed for one hour of spinning.

The respective measured and calculated values for the electret nonwoven fabric obtained are presented in Table 1.

Example 9

An electret nonwoven fabric was obtained in the same manner as in Example 4 except that the additive rate of the crystal nucleating agent "Irgaclear" (registered trademark) XT386 (manufactured by BASF Japan Ltd.) denoted as the compound B was set to 0.005% by mass. The basis weight of the nonwoven fabric was 30 g/m², and the average single fiber diameter thereof was 9.8 μm. The spinning property was favorable as yarn breakage was not observed for one hour of spinning.

The respective measured and calculated values for the electret nonwoven fabric obtained are presented in Table 1.

Example 10

An electret nonwoven fabric was obtained in the same manner as in Example 4 except that the additive rate of the crystal nucleating agent "Irgaclear" (registered trademark) XT386 (manufactured by BASF Japan Ltd.) denoted as the compound B was set to 0.5% by mass. The basis weight of the nonwoven fabric was 30 g/m², and the average single fiber diameter thereof was 10.1 μm. The spinning property was favorable as yarn breakage was not observed for one hour of spinning.

The respective measured and calculated values for the electret nonwoven fabric obtained are presented in Table 1.

Example 11

An electret nonwoven fabric was obtained in the same manner as in Example 1 except that the MFR was set to 60 g/10 minutes, the single-hole discharge rate was set to 0.43 g/min, and the ejector pressure was set to 0.15 MPa. The basis weight of the nonwoven fabric was 30 g/m², and the average single fiber diameter thereof was 14.0 μm. The spinning property was favorable as yarn breakage was not observed for one hour of spinning.

The respective measured and calculated values for the electret nonwoven fabric obtained are presented in Table 1.

Example 12

An electret nonwoven fabric was obtained in the same manner as in Example 11 except that the obtained nonwoven fiber web was temporarily heat-bonded at a temperature of 110° C. using a flat roll and the temporarily heat-bonded nonwoven web thus obtained was heat-bonded at a linear pressure of 10 N/cm and a heat bonding temperature of 120° C. using a pair of upper and lower heat embossing rolls composed of a metal embossing roll having polka dot engraving and a bonding area ratio of 16% as the upper roll and a metal flat rolls as the lower roll to obtain a spunbond nonwoven fabric having a basis weight of 200 g/m². The average single fiber diameter of the obtained spunbond nonwoven fabric was 14.0 μm. The spinning property was favorable as yarn breakage was not observed for one hour of spinning.

The respective measured and calculated values for the electret nonwoven fabric are presented in Table 1.

Comparative Example 1

A polypropylene resin composed of a homopolymer having an MFR of 800 g/min was melted using an extruder and spun from a nozzle having a pore diameter of 0.25 mm at a spinning temperature of 260° C. and a single-hole discharge rate of 0.10 g/min. Thereafter, air was injected into the yarns under the conditions of an air temperature of 290° C. and an air pressure of 0.10 MPa, and the yarns were collected on the heat-sealing nonwoven fabric layer to form a melt blown nonwoven fabric. The basis weight of the nonwoven fabric was 20 g/m², and the average single fiber diameter thereof was 4 μm.

This nonwoven fabric was subjected to an electret-forming treatment to obtain an electret nonwoven fabric. The respective measured and calculated values for the electret nonwoven fabric are presented in Table 1.

The obtained nonwoven fabric had significantly excellent collecting efficiency, but was inferior in tensile strength, and had a high pressure loss, and did not reach the range in which the nonwoven fabric was able to be used for air filter applications.

Comparative Example 2

A spunbond nonwoven fabric was obtained in the same manner as in Example 1 except that the additive rate of the hindered amine-based compound A "Chimassorb" (registered trademark) 944LD (manufactured by BASF Japan Ltd.) was set to 1% by mass. The basis weight of the nonwoven fabric was 30 g/m², and the average single fiber diameter thereof was 10.1 μm. The spinning property was favorable as yarn breakage was not observed for one hour of spinning.

This nonwoven fabric was subjected to an electret-forming treatment to obtain an electret nonwoven fabric. The respective measured and calculated values for the electret nonwoven fabric are presented in Table 1.

The obtained nonwoven fabric had a low collecting efficiency and did not reach the range in which the nonwoven fabric was able to be used for air filter applications.

Comparative Example 3

A spunbond nonwoven fabric was obtained in the same manner as in Example 1 except that the MFR was set to 30 g/10 minutes and the single-hole discharge rate was set to 0.70 g/min. The basis weight of the nonwoven fabric was 30 g/m², and the average single fiber diameter thereof was 22.5 μm. The spinning property was favorable as yarn breakage was not observed for one hour of spinning.

This nonwoven fabric was subjected to an electret-forming treatment to obtain an electret nonwoven fabric. The respective measured and calculated values for the electret nonwoven fabric are presented in Table 1.

The obtained nonwoven fabric had a low collecting efficiency and did not reach the range in which the nonwoven fabric was able to be used for air filter applications.

TABLE 1

| | | Unit | Example 1 | Example 2 | Example 3 | Example 4 | Example 5 | Example 6 | Example 7 | Example 8 |
|---|---|---|---|---|---|---|---|---|---|---|
| Raw material | Kind of resin | — | PP | PP | PP | PP | PP | PP | PP | PP |
| | MFR of resin | g/10 minutes | 200 | 800 | 155 | 200 | 200 | 155 | 800 | 39 |
| | Additive 1 | — | A | A | A | A | C | C | A | A |
| | Additive rate | % | 1 | 1 | 1 | 1 | 1 | 1 | 1 | 1 |
| | Additive 2 | — | — | — | — | B | — | — | — | — |
| | Additive rate | % | — | — | — | 0.05 | — | — | — | — |
| Fiber | Average single fiber diameter | μm | 10.1 | 7.2 | 8.9 | 9.8 | 11.8 | 11.8 | 6.6 | 21.5 |
| Nonwoven fabric | Temporary heat bonding roll temperature | ° C. | 120 | 120 | 120 | 120 | 145 | 145 | 120 | 120 |
| | Heat bonding temperature | ° C. | 130 | 130 | 130 | 130 | 145 | 145 | 130 | 130 |
| | Basis weight | g/m² | 30 | 30 | 45 | 30 | 60 | 20 | 10 | 23 |
| | Thickness | mm | 0.30 | 0.30 | 0.41 | 0.30 | 0.60 | 0.20 | 0.10 | 0.20 |
| | MFR of nonwoven fabric | g/10 minutes | 210 | 810 | 160 | 210 | 210 | 160 | 810 | 41 |
| | Tensile strength per unit basis weight in longitudinal direction | (N/5 cm)/(g/m²) | 2.2 | 2.2 | 2.2 | 2.3 | 1.8 | 1.8 | 3.1 | 2.0 |
| | Pressure loss | Pa | 10.0 | 12.0 | 16.0 | 9.0 | 23.0 | 6.0 | 3.5 | 2.3 |
| | Collecting efficiency | % | 78 | 84 | 91 | 77 | 97 | 60 | 50 | 37 |
| | QF value | Pa⁻¹ | 0.15 | 0.15 | 0.15 | 0.16 | 0.15 | 0.15 | 0.20 | 0.20 |
| | Pressure loss per unit basis weight | (Pa)/(g/m²) | 0.33 | 0.40 | 0.36 | 0.30 | 0.38 | 0.30 | 0.35 | 0.10 |
| | Density | g/cm³ | 0.100 | 0.100 | 0.110 | 0.100 | 0.100 | 0.100 | 0.100 | 0.115 |

TABLE 1-continued

| | | Unit | Example 9 | Example 10 | Example 11 | Example 12 | Comparative Example 1 | Comparative Example 2 | Comparative Example 3 |
|---|---|---|---|---|---|---|---|---|---|
| Raw material | Kind of resin | — | PP | PP | PP | PP | PP | PP | PP |
| | MFR of resin | g/10 minutes | 200 | 200 | 60 | 60 | 800 | 200 | 30 |
| | Additive 1 | — | A | A | A | A | A | A | A |
| | Additive rate | % | 1 | 1 | 1 | 1 | 1 | 0.09 | 1 |
| | Additive 2 | — | B | B | — | — | — | — | — |
| | Additive rate | % | 0.005 | 0.5 | — | — | — | — | — |
| Fiber | Average single fiber diameter | μm | 9.8 | 10.1 | 14.0 | 14.0 | 4.0 | 10.1 | 22.5 |
| Nonwoven fabric | Temporary heat bonding roll temperature | °C. | 120 | 120 | 120 | 110 | — | 120 | 120 |
| | Heat bonding temperature | °C. | 130 | 130 | 130 | 120 | — | 130 | 130 |
| | Basis weight | g/m² | 30 | 30 | 30 | 200 | 22 | 30 | 30 |
| | Thickness | mm | 0.30 | 0.30 | 0.28 | 2.30 | 0.30 | 0.30 | 0.30 |
| | MFR of nonwoven fabric | g/10 minutes | 210 | 210 | 60 | 63 | 810 | 210 | 32 |
| | Tensile strength per unit basis weight in longitudinal direction | (N/5 cm)/(g/m²) | 2.2 | 2.2 | 1.8 | 2.2 | 0.1 | 2.2 | 1.5 |
| | Pressure loss | Pa | 9.8 | 8.8 | 7.0 | 36.0 | 20.0 | 10.0 | 2.8 |
| | Collecting efficiency | % | 77 | 77 | 65 | 99 | 90 | 5 | 28 |
| | QF value | Pa⁻¹ | 0.15 | 0.17 | 0.15 | 0.13 | 0.12 | 0.01 | 0.12 |
| | Pressure loss per unit basis weight | (Pa)/(g/m²) | 0.33 | 0.29 | 0.23 | 0.18 | 0.91 | 0.33 | 0.09 |
| | Density | g/cm³ | 0.100 | 0.100 | 0.107 | 0.087 | 0.073 | 0.100 | 0.100 |

The spunbond nonwoven fabrics of Examples 1 to 10, which include fibers formed of a polyolefin-based resin and in which the average single fiber diameter of the fibers is 6.5 μm or more and 22.0 μm or less, a hindered amine-based compound is contained at 0.1% by mass or more and 5% by mass or less, the melt flow rate (MFR) of the nonwoven fabric is 32 g/10 minutes or more and 850 g/10 minutes or less, and the nonwoven fabrics are processed into an electret, have a high tensile strength per unit basis weight and achieve high collecting performance. On the other hand, the pressure loss is high since the basis weight is high in Comparative Example 1, the tensile strength of the nonwoven fabric per unit basis weight is low since the nonwoven fabric is a melt blown nonwoven fabric in Comparative Example 2, and the nonwoven fabric is not sufficiently converted into an electret and the collecting efficiency is low since the additive rate of the hindered amine-based compound A is low in Comparative Example 3. The average single fiber diameter is large, and as a result, the collecting efficiency is low in Comparative Example 4.

INDUSTRIAL APPLICABILITY

According to the present invention, a high-performance spunbond nonwoven fabric having low pressure loss and high collecting performance can be obtained, and this spunbond nonwoven fabric can be preferably used as a filter medium in an air filter, but the application range thereof is not limited to this.

DESCRIPTION OF REFERENCE SIGNS

1: Sample holder
2: Dust storage box
3: Flow meter
4: Flow adjusting valve
5: Blower
6: Particle Counter
7: Switching cock
8: Pressure gauge
M: Measurement sample

The invention claimed is:

1. A spunbond nonwoven fabric comprising fibers formed of a polyolefin-based resin, wherein
   an average single fiber diameter of the fibers is 6.5 μm or more and 22.0 μm or less,
   a hindered amine-based compound is contained at 0.1% by mass or more and 5% by mass or less,
   a melt flow rate (MFR) of the nonwoven fabric is 32 g/10 minutes or more and 850 g/10 minutes or less,
   a crystal nucleating agent is contained in the nonwoven fabric at 0.001% by mass or more and 1.0% by mass or less, and
   the nonwoven fabric is processed into an electret.

2. The spunbond nonwoven fabric according to claim 1, wherein the hindered amine-based compound includes a compound represented by the following Formula (1):

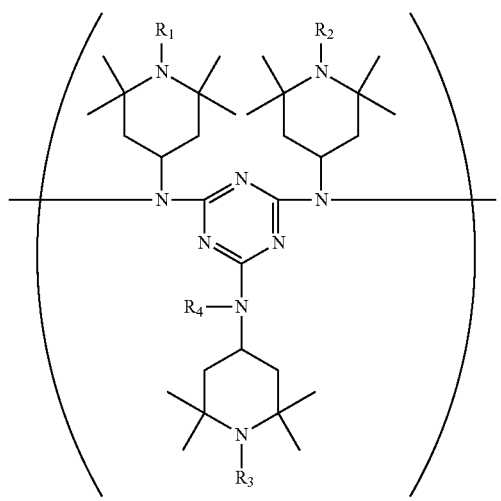

Formula (1)

wherein $R^1$ to $R^3$ are hydrogen or an alkyl group having 1 to 2 carbon atoms and $R^4$ is hydrogen or an alkyl group having 1 to 6 carbon atoms.

3. The spunbond nonwoven fabric according to claim 1, wherein a basis weight of the nonwoven fabric is 5 g/m² or more and 60 g/m² or less.

4. The spunbond nonwoven fabric according to claim 1, wherein a thickness of the nonwoven fabric is 0.05 mm or more and 1.0 mm or less.

5. The spunbond nonwoven fabric according to claim 1, wherein a tensile strength per unit basis weight in a longitudinal direction is 0.3 (N/5 cm)/(g/m²) or more.

6. The spunbond nonwoven fabric according to claim 1, wherein a pressure loss per unit basis weight is 0.10 to 0.50 (Pa)/(g/m²) or less.

7. A filter medium for air filter comprising the nonwoven fabric according to claim 1.

8. A spunbond nonwoven fabric comprising fibers formed of a polyolefin-based resin, wherein
- an average single fiber diameter of the fibers is 6.5 μm or more and 13.0 μm or less,
- a compound represented by the following Formula (1) is contained at 0.1% by mass or more and 5% by mass or less,
- a melt flow rate (MFR) of the nonwoven fabric is 80 g/10 minutes or more and 850 g/10 minutes or less,
- a crystal nucleating agent is contained in the nonwoven fabric at 0.001% by mass or more and 1.0% by mass or less, and
- the nonwoven fabric is processed into an electret,

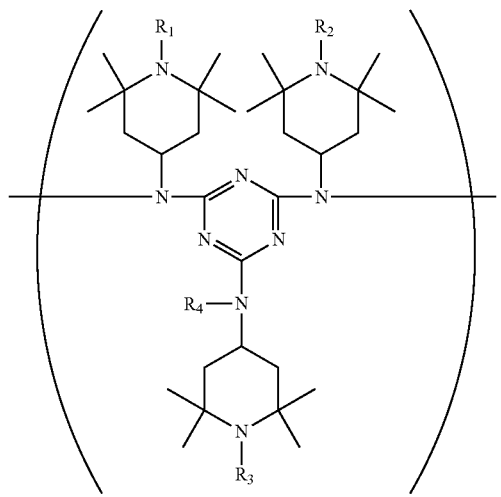

Formula (1)

wherein $R^1$ to $R^3$ are hydrogen or an alkyl group having 1 to 2 carbon atoms and $R^4$ is hydrogen or an alkyl group having 1 to 6 carbon atoms.

* * * * *